(12) United States Patent
Day

(10) Patent No.: US 11,094,328 B2
(45) Date of Patent: Aug. 17, 2021

(54) CONFERENCING AUDIO MANIPULATION FOR INCLUSION AND ACCESSIBILITY

(71) Applicant: NCR Corporation, Atlanta, GA (US)

(72) Inventor: Phil Noel Day, Fife (GB)

(73) Assignee: NCR Corporation, Atlanta, GA (US)

( * ) Notice: Subject to any disclaimer, the term of this patent is extended or adjusted under 35 U.S.C. 154(b) by 109 days.

(21) Appl. No.: 16/586,258

(22) Filed: Sep. 27, 2019

(65) Prior Publication Data

US 2021/0098013 A1   Apr. 1, 2021

(51) Int. Cl.
| | | |
|---|---|---|
| *G10L 17/00* | (2013.01) | |
| *G10L 21/013* | (2013.01) | |
| *H04L 29/06* | (2006.01) | |
| *G10L 21/0364* | (2013.01) | |

(52) U.S. Cl.
CPC ............ *G10L 17/00* (2013.01); *G10L 21/013* (2013.01); *G10L 21/0364* (2013.01); *H04L 65/403* (2013.01); *H04L 65/80* (2013.01)

(58) Field of Classification Search
CPC ..... G06F 3/16; G06K 9/00221; G10L 15/063; G10L 15/20; G10L 17/00; G10L 17/02; G10L 17/06; G10L 21/013; G10L 21/0364; G10L 21/06; G10L 25/51; G10L 15/22; G10L 15/30; G10L 19/00; G10L 19/0204; G10L 21/02; H04L 65/403; H04L 65/80; H04R 25/356; G10H 1/366; G11B 20/10527; H03G 3/04; H03G 5/005
USPC ......... 375/346; 381/102; 455/414.1; 700/94; 704/201, 207, 208, 225, 226, 233, 246
See application file for complete search history.

(56) References Cited

U.S. PATENT DOCUMENTS

| | | | |
|---|---|---|---|
| 7,752,038 B2* | 7/2010 | Laaksonen | G10L 25/90 704/207 |
| 9,705,460 B2* | 7/2017 | Kuromusha | H03G 3/04 |
| 10,354,631 B2* | 7/2019 | Daido | H03G 9/025 |
| 10,943,619 B2* | 3/2021 | Kanevsky | G11B 20/10527 |
| 2004/0143433 A1* | 7/2004 | Marumoto | H03G 5/22 704/225 |
| 2007/0050188 A1* | 3/2007 | Blair | G10L 13/033 704/207 |
| 2007/0237271 A1* | 10/2007 | Pessoa | G10L 21/0208 375/346 |
| 2009/0119097 A1* | 5/2009 | Master | G10H 1/0008 704/207 |
| 2009/0216529 A1* | 8/2009 | Bengtsson | G10L 21/02 704/233 |
| 2010/0004927 A1* | 1/2010 | Endo | H03G 3/32 704/226 |
| 2011/0046761 A1* | 2/2011 | Titchener | G11B 27/034 700/94 |

(Continued)

*Primary Examiner* — Gerald Gauthier
(74) *Attorney, Agent, or Firm* — Schwegman, Lundberg & Woessner

(57) ABSTRACT

Various embodiments herein each include at least one of systems, methods, and software for conference audio manipulation for inclusion and accessibility. One embodiment, in the form of a method that may be performed, for example, on a server or a participant computing device. This method includes receiving a voice signal via a network and modifying an audible characteristic of the voice signal that is perceptible when the voice signal is audibly output. The method further includes outputting the voice signal including the modified audible characteristic.

10 Claims, 4 Drawing Sheets

(56) References Cited

U.S. PATENT DOCUMENTS

| | | | |
|---|---|---|---|
| 2013/0003989 A1* | 1/2013 | Tsang | H03G 9/005 |
| | | | 381/102 |
| 2014/0006018 A1* | 1/2014 | Bonada | G10L 21/013 |
| | | | 704/208 |
| 2014/0297271 A1* | 10/2014 | Geiser | G10L 19/02 |
| | | | 704/207 |
| 2014/0343933 A1* | 11/2014 | Zhao | G10L 25/00 |
| | | | 704/207 |
| 2015/0011192 A1* | 1/2015 | Young | H04M 3/42391 |
| | | | 455/414.1 |
| 2015/0269953 A1* | 9/2015 | Siami | G10L 21/02 |
| | | | 704/201 |
| 2016/0239253 A1* | 8/2016 | Staffaroni | H03G 5/025 |
| 2016/0372135 A1* | 12/2016 | Lee | G10L 19/06 |
| 2017/0076749 A1* | 3/2017 | Kanevsky | G06F 3/165 |
| 2017/0125024 A1* | 5/2017 | Sundararajan | G10L 25/15 |
| 2017/0287495 A1* | 10/2017 | Tada | G10L 19/167 |
| 2018/0040325 A1* | 2/2018 | Melanson | G10L 17/24 |
| 2019/0371295 A1* | 12/2019 | He | G10L 15/063 |
| 2019/0392849 A1* | 12/2019 | Clark | H03G 9/025 |
| 2020/0065058 A1* | 2/2020 | Clark | H03G 9/005 |
| 2020/0076389 A1* | 3/2020 | Jeong | H04N 21/4398 |
| 2020/0380979 A1* | 12/2020 | Meacham | G10L 21/0208 |
| 2021/0098013 A1* | 4/2021 | Day | H04L 65/80 |

\* cited by examiner

CONFERENCING AUDIO MANIPULATION FOR INCLUSION AND ACCESSIBILITY

BACKGROUND INFORMATION

Voice is often used for collaboration at a distance, originally via telephones, now more often using voice over IP or video conferencing facilities. However, when there are multiple voices speaking, it can be difficult to distinguish between individuals, particularly if some individuals share similar characteristics such accent, timbre, and depth of speaking voice. Such challenges can be exacerbated when the call quality is poor, resulting in lower fidelity audio which removes even more of the detail that is otherwise useful in distinguishing voices. A further challenge arises when some voices are from a different culture or region; there is evidence in psychology literature that we are worse at perceiving subtle differences between people, both visual and auditory information, thus distinguishing voices when they speak with a different accent from ourselves can be difficult. This challenge is greatest with accents to which individuals have had little prior exposure.

In addition, there are a significant number of people that have some level of hearing loss, with this being considerably more frequent in older people. One of the characteristics of hearing loss is that some frequencies are attenuated, meaning that ranges of frequency are no longer perceived, thus others become more apparent. This means that it can be ever, more difficult tor those with reduced auditory acuity to distinguish between voices.

Even in other circumstances, audio can be difficult to understand for reasons such as background noise, echo, static, and other interfering noises.

SUMMARY

Various embodiments herein each include at least one of systems, methods, and software for conference audio manipulation for inclusion and accessibility. One embodiment, in the form of a method that may be performed, for example, on a server or a participant computing device. This method includes receiving a voice signal via a network and modifying an audible characteristic of the voice signal that is perceptible when the voice signal is audibly output. The method further includes outputting the voice signal including the modified audible characteristic.

Another method embodiment includes receiving, by a computing device via a network, audio signals that form at least a portion of a communication session between at least two participants, the audio signals renderable by an audio output device of the computing device. This method then processes, by a processor of the computing device, each audio signal in view of at least one audio modification process. This processing may include identifying subject portions of a respective audio signal to be modified and modifying audible characteristics of the identified subject portions of the respective audio signal. The method then proceeds by outputting the audio signals including the modified audible characteristics from the audio output device.

A further embodiment is in the form of a computing device that includes a network interface device, an audio output device, a processor, and a memory. The memory of such embodiments stores instructions executable by the processor to perform audio data processing activities. The audio data processing activities may include receiving, via the network interface device, audio signals renderable by the audio output device that form at least a portion of a communication session with at least one other participant. Such embodiments further include processing each audio signal in view of at least one audio modification process by identifying subject portions of a respective audio signal to be modified and modifying audible characteristics of the identified subject portions of the respective audio signal. The audio data processing activities may then output the audio signals including the modified audible characteristics from the audio output device.

DETAILED DESCRIPTION

Figure 1:
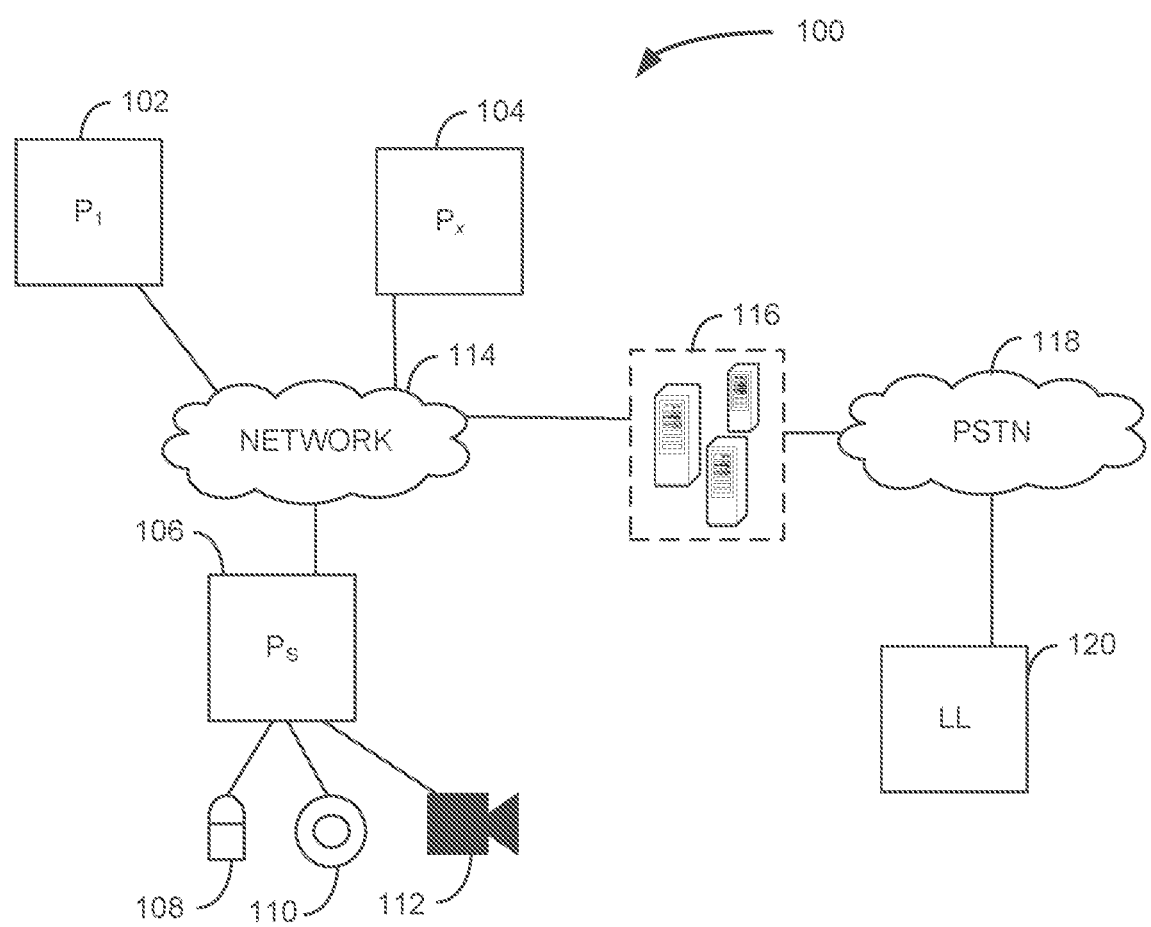
FIG. 1 is a logical block diagram of a system, according to an example embodiment.

Various embodiments herein each include at least one of systems, methods, and software for conference audio manipulation for inclusion and accessibility. These embodiments address the challenges discussed above such as by manipulating audio signals, including audio signals with voice audio, to aid hear-ability and clarity, to assist distinguishability of voices, and, in some embodiments, simply to enhance audio collaboration. Various audio manipulations are described, but other audio manipulations are quite possible and within the vision of the platform embodiments presented herein. Regardless, in the presented embodiments, audio is manipulated for one or more of the purposes enumerated above, e.g., aiding at least one of clarity and perceptibility. Some embodiments provide particular benefits when in group conversations such as multiparty audio conferences but are also of benefit for improving clarity and perceptibility of a single voice for a hearing-impaired user.

The various audio processing techniques described herein may be implemented individually, or in some embodiments, may be combined in various combinations or in their entirety in order to offer more flexible solutions. These audio processing techniques may include adding a fundamental frequency such as a single tone, adding multiple frequencies such as overtones or harmonics, constraining one or more frequency ranges (e.g., vocoder), adding or removing distortion, compression, and attack, and manipulating spatial separation. In some embodiments, additional content (e.g., frequency, noise or spatial location) that is added to a voice can be controlled in an automated manner or can also be controlled manually according to user specific preference settings.

Determining which audio streams to modify and how they are to be modified may be performed in various manners. In one embodiment, an audio stream may be modified based on user specified modifications, selection of a preset sound processing technique, a profile stored in association with a source of the audio stream (e.g., a phone number, an Internet Protocol Address, a user identifier associated with the stream), and the like. However, in some embodiments an audio stream may be variably modified based on an identity or a characteristic of a speaker that may be identified.

The speaker or characteristic of the speaker may be identified by processing the audio stream with a speaker recognition, or diarization, process. Examples of such a speaker recognition process is the Speaker Recognition software product available from MICROSOFT CORPORATION of Redmond, Wash. or AMAZON TRANSCRIBE available from AMAZON WEBSERVICES, INC. of Seattle, Wash. As a speaker is identified, the audio stream or the portion of the audio stream of the speaker may be modified according to an audio modification processing profile associated with that speaker or an accent, echo, or other audio characteristic identified in the audio stream. Thus, in some embodiments, for example, when an audio stream is received from a conference room where there are multiple speakers, each speaker may be identified individually and have their speech modified according to a profile of the identified speaker.

A speaker profile may be defined for a specific speaker or more generally for speakers or audio streams having certain characteristics. Such characteristics may include echo, certain accents, line static, low volume, and the like. A speaker profile may be established for a specific individual by identifying a speaker in one or more audio portions to the speaker recognition software. This trains the speaker recognition software and a speaker profile identifier is established for the recognized speaker, typically in the form of unique identifying data that corresponds to data that the speaker recognition process outputs when a speaker is identified with regard to an audio stream. A speaker profile in such embodiments herein further include one or more audio processing techniques associated therewith with respective configuration settings. Such configuration settings may include application of audio processing algorithms to remove echo, accents, frequency shifting, volume adjustments, and the like. A speaker profile in such embodiments is typically stored in manner that it is accessible at a point where the audio processing is performed, such as on a local user device (e.g., personal computer, smartphone, Voice Over Internet Protocol phone) or in a location accessible via a data network. Thus, in some embodiments when an audio stream is received, a speaker recognition process operates to identify a speaker, a speaker profile is retrieved based on the identified speaker, and the audio stream for that speaker is processed according to the speaker profile.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices.

Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example of a system within which some embodiments may be implemented. However, the techniques of audio data processing herein may be implemented on a single device, such as a smartphone or other mobile device, a personal computer, a telephone, within a headset, and other such devices.

The system 100 includes participant client devices 102, 104, 106. As illustrated, there are three audio collaboration participants $P_1$, $P_S$, $P_X$, where S is a subject participant, 1 is a first participant, and X is a total number of further participants and may be anywhere from zero to virtually any number. Note that $P_1$ may be an individual person, but in some embodiments, $P_1$ may be a content item from which audio is conveyed to other participants or an automated or other logical participant in an audio collaboration. Note as well that an audio collaboration may simply be a two-party or multi-party phone call over a network 114, which may also include a participant that connects via a landline device 120, a teleconference utilizing a dial-in teleconferencing service, or a web conference which may also include one or more visual components (e.g., video, whiteboard, textual chat messaging).

The client devices 102, 104, 106 may include a smartphone, tablet, personal computer, Voice Over IP (VOIP) telephone, smart speaker, display, other smart home device, or other computing device. The client devices 102, 104, 106 connect to a network 114. The network 114 may include one or more of a local area network (LAN), the Internet, a wide area network (WAN), a wireless service provider network, and other such networks.

Also connected to the network 114 may be a server 116, or even several servers 116. The server 116 may perform one or more functions, such as hosting a collaboration over the network 114, providing public switched telephone network (PSTN) 118 dial in services such that landline telephones 120 may be used to participate in audio of a collaboration or more basic teleconference. In some embodiments, audio manipulation as described herein may be performed for all participants equally on the server 116. In other embodiments, each participant may specify how audio provided to them is manipulated on the server 116 prior to retransmission over the network 114 or the PSTN 118. However, in other embodiments, audio is manipulated in whole or in part on the client devices 102, 104, 106.

In some embodiments, a server 116 performs speaker recognition processing, also commonly known as diarization. The speaker recognition processing may be performed on a server 116 located within the network of a company or other organization or be a cloud-based, hosted solution, such as the Speaker Recognition software product available from MICROSOFT CORPORATION of Redmond, Wash. or AMAZON TRANSCRIBE available from AMAZON WEBSERVICES, INC of Seattle. Wash. In such embodiments, profiles of a set of known speakers may be stored on the server 116 or on participant client devices to modify audio streams from identified speakers to aid in the understandability of the particular speaker. In some instances, the speaker recognition processing may also provide text of recognized speech in the audio stream(s) to enable captioning of speech for purposes of aiding in understanding and accessibility for the hearing-impaired.

A speaker profile may be defined for a specific speaker or more generally for speakers or audio streams having certain characteristics. Such characteristics may include echo, certain accents, line static, low volume, and the like. A speaker profile may be established for a specific individual by identifying a speaker in one or more audio portions to the speaker recognition software. This trains the speaker recognition software and a speaker-profile identifier is established for the recognized speaker. The speaker recognition software establishes its own data when trained for a speaker. A speaker profile for some embodiments herein includes unique identifying data that corresponds to data that the speaker recognition process outputs when a speaker is identified with regard to an audio stream. A speaker profile in such embodiments further includes data identifying one or more audio processing techniques associated therewith with respective configuration settings. The audio processing techniques of a speaker profile may be based on user input received with regard to the speaker profile or may be preconfigured. Configuration settings of speaker profiles may include configuration settings for applying audio processing algorithms to remove echo, accents, frequency shifting, volume adjustments, and the like.

A speaker profile in such embodiments is typically stored in manner that it is accessible at a point where the audio processing is performed, such as on a client device 102, 104, 106 or server 116 or in a location accessible via the network 114 such as on the server 116. Thus, in some embodiments when an audio stream is received, a speaker recognition process operates to identify a speaker, a speaker profile is retrieved based on the identified speaker, and the audio stream for that speaker is processed according to the speaker profile.

Each of the client devices 102, 104, 106 typically includes several devices therein. For example, general details of the client devices 102, 104, 106 in some embodiments are further illustrated and described below with regard to FIG. 4. In particular, the client devices, such as client device 106, may include one or more of a microphone 108, a speaker 110, and a camera 112. In some embodiments, two or all of these devices may be combined into a single device, such as the microphone 108 embedded in the camera 112 or the microphone 108 and speaker 110 being embedded in a single headset device.

Figure 2:
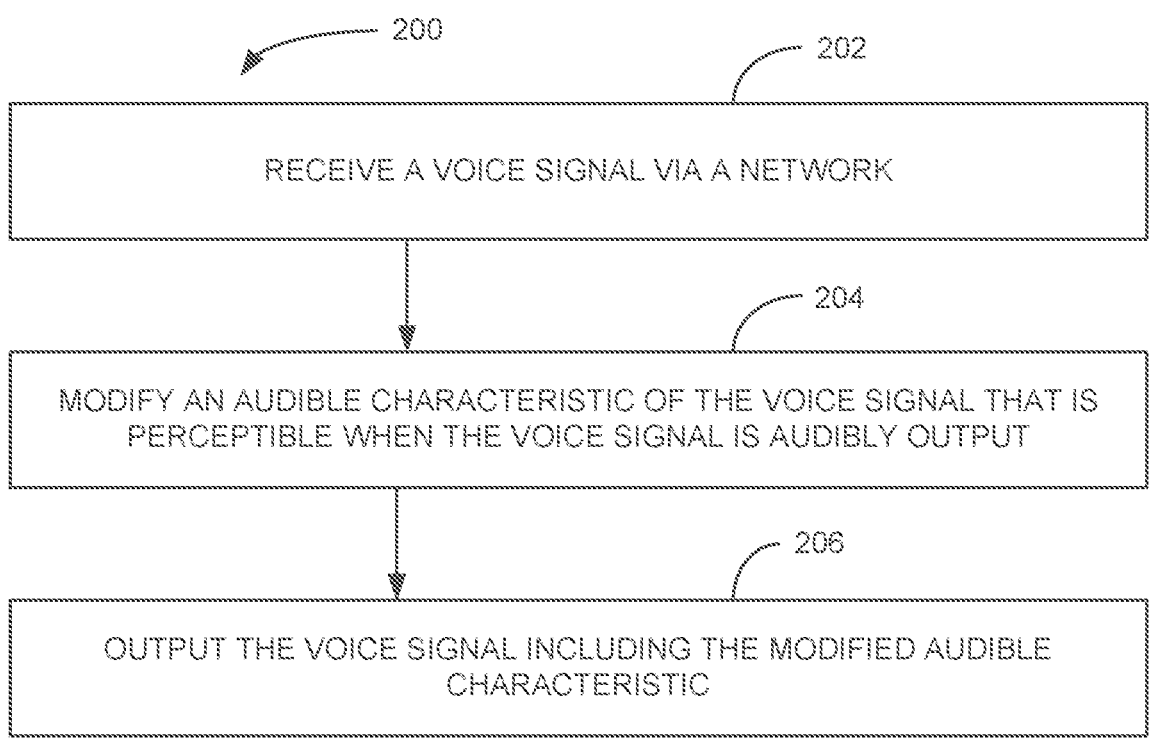
FIG. 2 is a block flow diagram of a method, according to an example embodiment.
Figure 3:
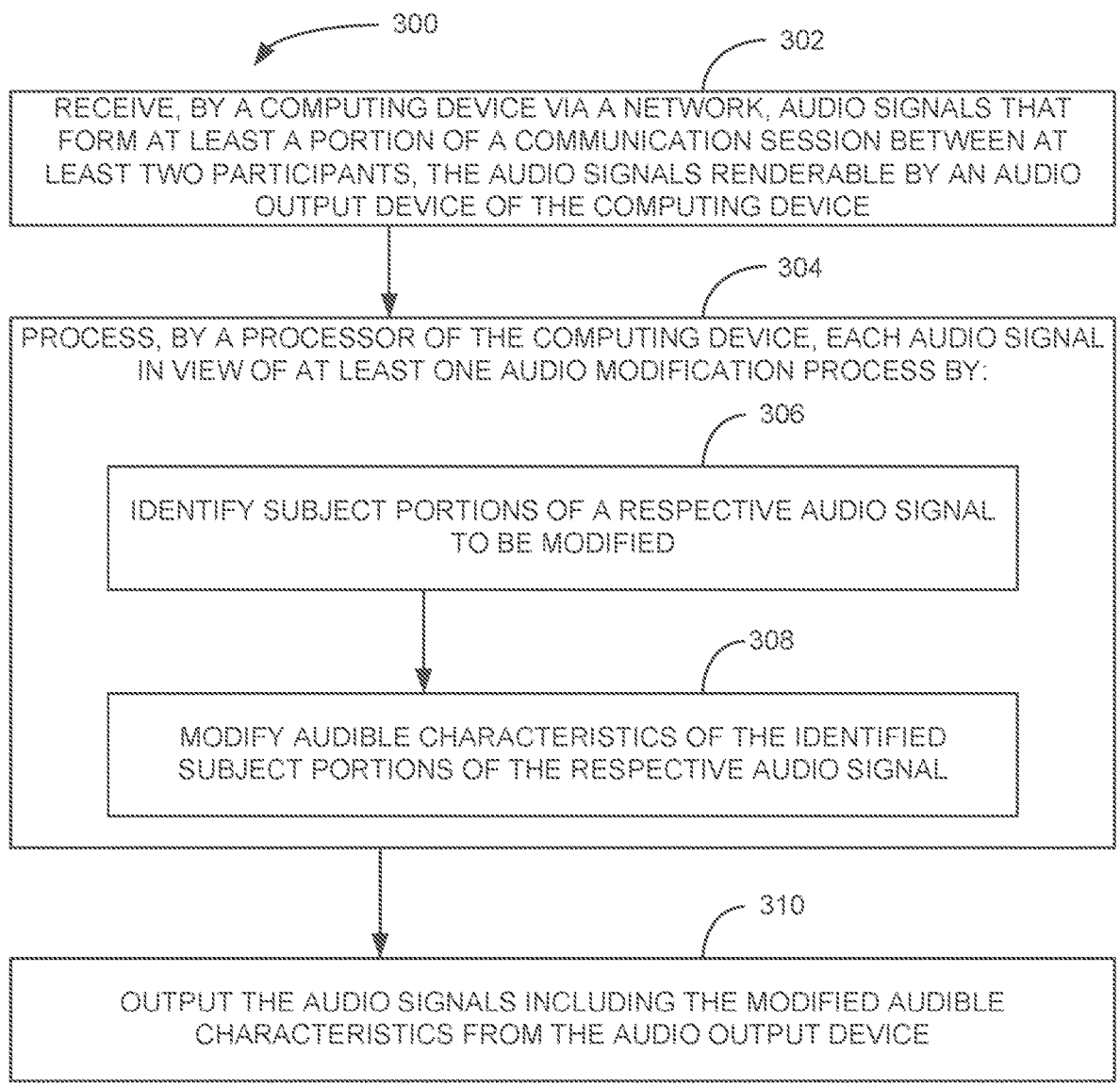
FIG. 3 is a block flow diagram of a method, according to an example embodiment.

Further details of the audio processing of some embodiments is described with regard to FIG. 2 and FIG. 3. Method 200 of FIG. 2 may be performed on either the server 116, on a client device 102, 104, 106, or in some embodiments, even on the land line telephone 120. Method 300 of FIG. 3 is typically performed on a client device 102, 104, 106.

FIG. 2 is a block flow diagram of the method 200, according to an example embodiment. The method 200 includes receiving 202 a voice signal via a network and modifying 204 an audible characteristic of the voice signal that is perceptible when the voice signal is audibly output. The method 200 then proceeds by outputting 206 the voice signal including the modified audible characteristic.

In some embodiments, the audible characteristic of the voice signal is modified 204 based on a speaker profile. A speaker profile may be selected to make the modification 204 based on one or both of a property and content of the voice signal. For example, a property of the voice signal may be a source of the voice signal, such as a phone number, an Internet Protocol (IP) address of a device from which the voice signal originated, a user identifier included as metadata or other data within the voice signal, and the like. The content of the voice signal may be processed in some embodiments by a speaker recognition process to obtain an identifier of the actual speaker or to obtain a general identity, such as a speaker from a particular country, region, or as having certain characteristics in their speech, for example an echo, low volume, drawl, slur, and like. Regardless of the whether a property or content is utilized, an identifier is obtained which may then be utilized to retrieve one or more stored speaker profiles. Such speaker profiles generally identities at least one audible characteristic of the voice signal that is to be modified and how each of the at least one audible characteristics are to be modified.

In some embodiments of the method 200, the audible characteristic of the voice signal is an audible frequency range. In some such embodiments, modifying 204 the audible characteristic includes changing occurrences of the audible frequency range within the voice signal to a different audible frequency range based on a user setting.

In another embodiment, modifying 204 the audible characteristic of the voice signal includes modifying a plurality of audible characteristics of the voice signal. The modifying 204 of the audible characteristics may include adding a fundamental frequency such as a single tone, adding multiple frequencies such as overtones or harmonics, constraining ore or more frequency ranges (e.g., vocoder), adding or removing distortion, compression, and attack, manipulating spatial separation, and applying a filter to remove an audible portion of the voice signal. In some embodiments, additional content (e.g., frequency, noise or spatial location) may even be added to a voice and be controlled in an automated or manual manner, such as according to user specific preference settings.

FIG. 3 is a block flow diagram of a method 300, according to an example embodiment. The method 300 includes receiving 302, by a computing device via a network, audio signals that form at least a portion of a communication session between at least two participants. The received 302 audio signals are generally renderable by an audio output device of the computing device, such as by a digital to analog converting device that outputs an audio signal from a speaker or other device.

The method 300 further includes processing 304, by a processor of the computing device, each audio signal in view of at least one audio modification process. Some of the at least one audio modification processes may include identifying 306 subject portions of a respective audio signal to be modified and modifying 308 audible characteristics of the identified subject portions. The method 300 may then output 310 the audio signals including the modified audible characteristics from the audio output device.

In some embodiments, the at least one audio modification process includes a volume normalizing process to normalize a volume across all received audio signals to ensure each audio signal is loud enough to hear but not too loud. In one such embodiment of the method 300, the subject portions of a respective audio signal include identification of an entirety of an audio signal based on a particular source participant of the audio signal. For example, the respective audio signal may originate with a particular participant that has an accent that is difficult for some people to understand. Modifying the audio signal from the particular participant may make the speech easier to understand, such as through modification of attack, compression, distortion, volume, frequency shifting, or other characteristic of the audio signal. Some of these embodiments of the method 300 further include receiving, by the computing device, user input selecting the particular source participant and further receiving, by the computing device, user input selecting at least one audio modification process to be performed on audio signals received via the network from the particular source participant. Thus, such modifications may be made according to user set preferences, which may be stored in some embodiments with regard to the particular source participant for use whenever communicating with the particular participant.

In some embodiments, the at least one audio modification process includes a process tailored to a particular speaker-accent type to modify a subject audio signal to assist a listener in understanding dialog included in the subject audio signal. Such an audio modification process may be distributed with software that implements the method 300, shared within an organization or between users, available in a software marketplace for purchase or for free download, and the like.

In some of these embodiments of the method 300, similar to other embodiments herein, the at least one audio modification process includes a process tailored to relocated audio from a particular frequency range to a different frequency range. This relocation of audio between frequency ranges may be performed to assist hearing-deficient listeners in hearing audible content included in the subject audio signal.

Figure 4:
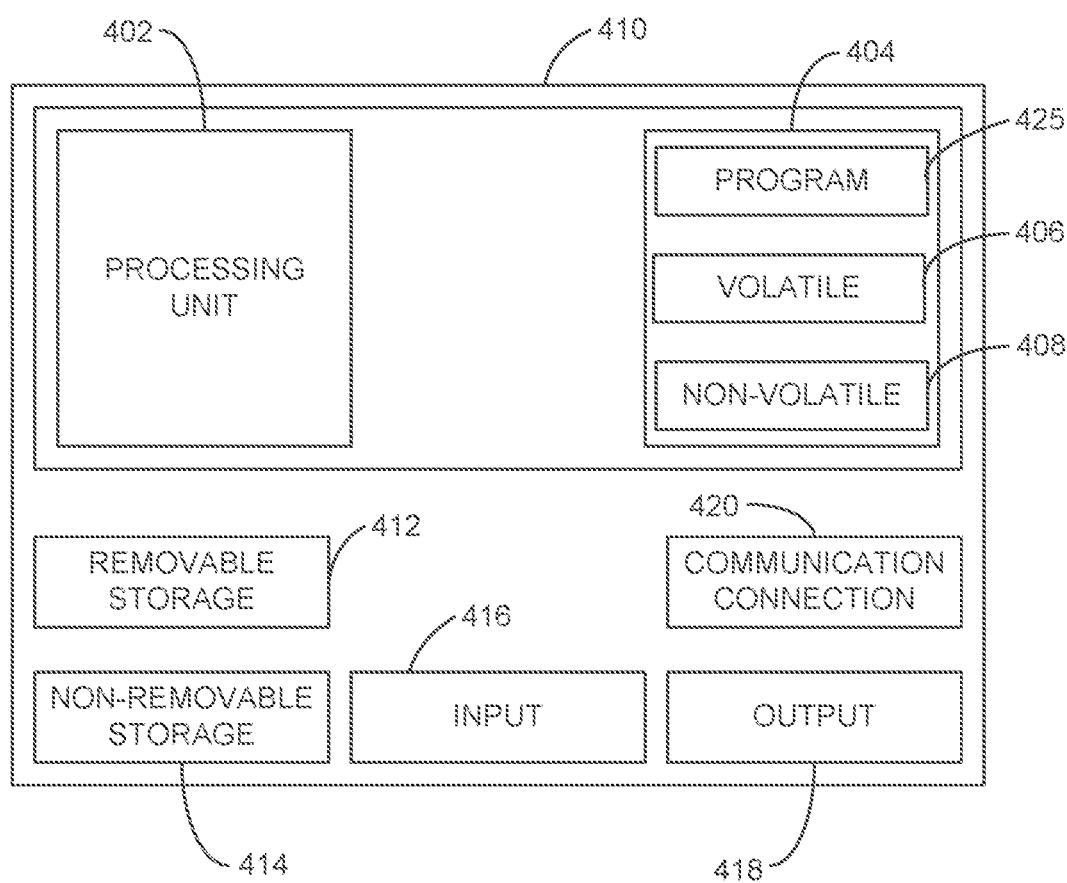
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices. For example, the communication connection 420 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, by a computing device, user input selecting:
     a particular source participant; and
     at least one audio modification process to be performed on at least a portion of audio signals received via a network from the particular source participant;
   receiving, by the computing device via the network, audio signals that form at least a portion of a communication session between at least two participants including the particular source participant, the audio signals renderable by an audio output device of the computing device;

processing, by a processor of the computing device, each audio signal in view of at least one audio modification process by:
identifying subject portions of a respective audio signal from the particular source participant of the audio signal to be modified; and
modifying audible characteristics of the identified subject portions of the respective audio signal; and
outputting the audio signals including the modified audible characteristics from the audio output device.

2. The method of claim 1, wherein at least one audio modification process includes a volume normalizing process to normalize a volume across all received audio signals.

3. The method of claim 1, wherein the at least one audio modification process to be performed on audio signals received via the network from the particular source participant includes an audio modification technique to cause voice signals received from the particular source participant to be located spatially at a certain location in a sound field when rendered by the audio output device.

4. The method of claim 1, wherein the at least one audio modification process includes a process tailored to a particular speaker accent type to modify a subject audio signal to assist a listener in understanding dialog included in the subject audio signal.

5. The method of claim 1, wherein the at least one audio modification process includes a process tailored to relocate audio from a particular frequency range to a different frequency range to assist a hearing-deficient listener in hearing audible content included in the subject audio signal.

6. The method of claim 1, wherein the voice signal is a Voice Over IP (VOIP) data signal.

7. The method of claim 1, wherein modifying audible characteristics of the identified subject portions of the respective audio signal include modifying at least one of:
frequency;
attack;
compression; and
distortion.

8. A computing device comprising:
a network interface device;
an input device;
an audio output device;
a processor;
a memory storing instructions executable by the processor to perform audio data processing activities comprising:
receiving, via the input device, user input selecting a particular source participant and at least one audio modification process to be performed on audio signals received via the network interface device from the particular source participant;
receiving, via the network interface device, audio signals that form at least a portion of a communication session with at least one other participant, the audio signals renderable by the audio output device;
processing each audio signal in view of at least one audio modification process by:
identifying subject portions of a respective audio signal to be modified; and
modifying audible characteristics of the identified subject portions of the respective audio signal; and
outputting the audio signals including the modified audible characteristics from the audio output device.

9. The computing device of claim 8, wherein the subject portions of a respective audio signal include identification of an entirety of an audio signal based on a particular source participant of the audio signal.

10. The computing device of claim 8, wherein the at least one audio modification process includes a process tailored to a particular speaker accent type to modify a subject audio signal to assist a listener in understanding dialog included in the subject audio signal.

* * * * *